(12) United States Patent
Gali

(10) Patent No.: US 11,273,868 B2
(45) Date of Patent: Mar. 15, 2022

(54) VEHICULAR TRAILER ASSIST SYSTEM

(71) Applicant: Magna Electronics Inc., Auburn Hills, MI (US)

(72) Inventor: Jyothi P. Gali, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 422 days.

(21) Appl. No.: 16/512,458

(22) Filed: Jul. 16, 2019

(65) Prior Publication Data

US 2020/0017143 A1 Jan. 16, 2020

Related U.S. Application Data

(60) Provisional application No. 62/717,108, filed on Aug. 10, 2018, provisional application No. 62/698,415, filed on Jul. 16, 2018.

(51) Int. Cl.
| | |
|---|---|
| *B26D 1/00* | (2006.01) |
| *B62D 15/02* | (2006.01) |
| *B60R 11/04* | (2006.01) |
| *B62D 13/06* | (2006.01) |
| *B60R 1/00* | (2022.01) |
| *G06T 7/70* | (2017.01) |

(52) U.S. Cl.
CPC ............ *B62D 15/028* (2013.01); *B60R 1/003* (2013.01); *B60R 11/04* (2013.01); *B62D 13/06* (2013.01); *G06T 7/70* (2017.01); *B60R 2300/105* (2013.01); *B60R 2300/303* (2013.01); *B60R 2300/806* (2013.01); *G06T 2207/30241* (2013.01); *G06T 2207/30252* (2013.01)

(58) Field of Classification Search
CPC .... B62D 15/028; B62D 13/06; B62D 15/027; B60R 1/003; B60R 11/04; B60R 2300/105; B60R 2300/303; B60R 2300/806; G06T 7/70; G06T 2207/30241; G06T 2207/30252; G06T 2207/10016
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |

(Continued)

*Primary Examiner* — James M Pontius
(74) *Attorney, Agent, or Firm* — Honigman LLP

(57) ABSTRACT

A vehicular trailer assist system includes a camera disposed at a rear portion of a vehicle and having a field of view exterior of the vehicle. A control includes a processor for processing image data captured by the camera. The control, responsive to processing at the control of captured image data, determines a trailer angle of a trailer hitched to the vehicle. Responsive to determining the trailer angle, the control determines a trailer direction that is based at least in part on the determined trailer angle. The control is operable to determine a virtual destination location that is a location that is a predetermined distance from the trailer and in the determined trailer direction. Responsive to determining the trailer direction, and during a reversing maneuver of the vehicle and trailer, the control controls steering of the vehicle to direct the trailer in the determined trailer direction toward the virtual destination location.

19 Claims, 7 Drawing Sheets

(56) References Cited

U.S. PATENT DOCUMENTS

| | | | |
|---|---|---|---|
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 8,874,317 B2 | 10/2014 | Marczok et al. | |
| 9,085,261 B2 | 7/2015 | Lu et al. | |
| 9,446,713 B2 | 9/2016 | Lu et al. | |
| 9,937,953 B2 | 4/2018 | Lavoie et al. | |
| 11,067,993 B2 | 7/2021 | Gali et al. | |
| 2009/0319100 A1 | 12/2009 | Kale et al. | |
| 2014/0085472 A1 | 3/2014 | Lu et al. | |
| 2014/0160276 A1 | 6/2014 | Pliefke et al. | |
| 2014/0309888 A1* | 10/2014 | Smit | B62D 13/06 701/41 |
| 2015/0002670 A1 | 1/2015 | Bajpai | |
| 2015/0158527 A1 | 6/2015 | Hafner et al. | |
| 2015/0197281 A1 | 7/2015 | Miller et al. | |
| 2015/0217693 A1 | 8/2015 | Pliefke et al. | |
| 2015/0344028 A1 | 12/2015 | Gieseke et al. | |
| 2016/0280267 A1* | 9/2016 | Lavoie | B62D 13/06 |
| 2017/0015312 A1 | 1/2017 | Latotzki | |
| 2017/0017847 A1 | 1/2017 | Nakaya | |
| 2017/0017848 A1 | 1/2017 | Gupta et al. | |
| 2017/0050672 A1 | 2/2017 | Gieseke et al. | |
| 2017/0217372 A1 | 8/2017 | Lu et al. | |
| 2017/0253237 A1 | 9/2017 | Diessner | |
| 2017/0254873 A1 | 9/2017 | Koravadi | |
| 2017/0317748 A1 | 11/2017 | Krapf | |
| 2017/0329346 A1 | 11/2017 | Latotzki | |
| 2018/0141658 A1 | 5/2018 | Baur | |
| 2018/0211528 A1 | 7/2018 | Seifert | |
| 2018/0215382 A1 | 8/2018 | Gupta et al. | |
| 2018/0253608 A1 | 9/2018 | Diessner et al. | |
| 2018/0276838 A1 | 9/2018 | Gupta et al. | |
| 2018/0276839 A1 | 9/2018 | Diessner et al. | |
| 2019/0016264 A1 | 1/2019 | Potnis et al. | |
| 2019/0039649 A1 | 2/2019 | Gieseke et al. | |
| 2019/0042864 A1 | 2/2019 | Pliefke et al. | |
| 2019/0064831 A1 | 2/2019 | Gali et al. | |
| 2019/0066503 A1 | 2/2019 | Li et al. | |
| 2019/0118860 A1 | 4/2019 | Gali et al. | |
| 2019/0143895 A1 | 5/2019 | Pliefke et al. | |
| 2019/0297233 A1 | 9/2019 | Gali et al. | |
| 2019/0347825 A1 | 11/2019 | Gupta et al. | |
| 2020/0017143 A1 | 1/2020 | Gali | |

\* cited by examiner

VEHICULAR TRAILER ASSIST SYSTEM

CROSS REFERENCE TO RELATED APPLICATIONS

The present application claims the filing benefits of U.S. provisional application Ser. No. 62/717,108, filed Aug. 10, 2018, and Ser. No. 62/698,415, filed Jul. 16, 2018, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vehicular trailer assist or driving assistance system or vision system for a vehicle that utilizes one or more cameras (preferably one or more CMOS cameras) to capture image data representative of images exterior of the vehicle, and includes a camera disposed at a rear portion of a vehicle and having a field of view exterior of the vehicle, the field of view encompassing at least a portion of a trailer hitched to the vehicle. The system also includes a control comprising an image processor operable to process image data captured by the camera and the image data captured by the camera is representative of the trailer hitched to the vehicle. The control, responsive to image processing of image data captured by the camera, is operable to determine a trailer angle of the trailer relative to the vehicle. Responsive to determining the trailer angle, the control is operable to determine a trailer direction. The determined trailer direction is based at least in part on the determined trailer angle. The control is also operable to determine a virtual destination location that is a predetermined distance from the trailer and in the determined trailer direction. In response to determining the determined trailer direction and the virtual destination location and during a reversing maneuver of the vehicle and trailer, the control controls steering of the vehicle to steer the vehicle and direct the trailer in the determined trailer direction.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The trailer assist system includes an image processor or image processing system that is operable to receive image data from one or more cameras and may provide an output to a display device for displaying images representative of the captured image data. Optionally, the trailer assist system may provide rearview display, such as a rearview display or a top down or bird's eye or surround view display or the like.

Figure 1:
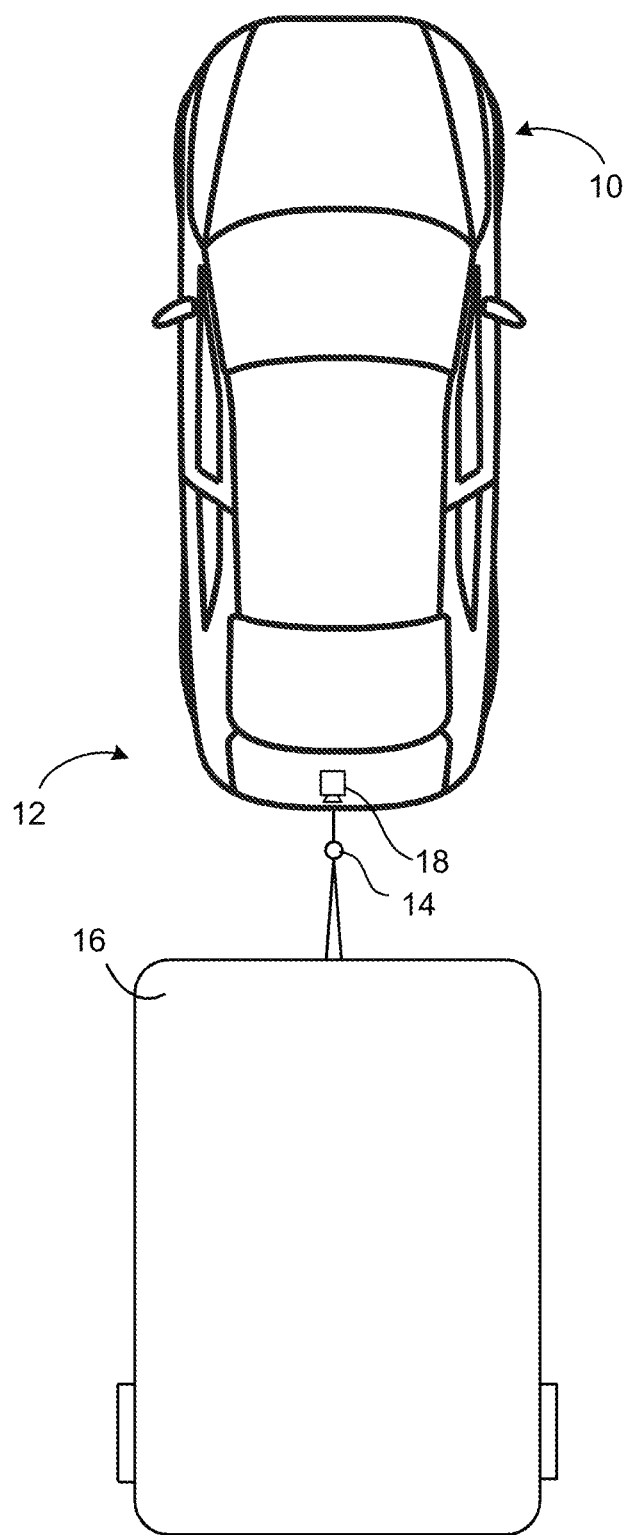
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a trailer maneuver assist system 12 that is operable to assist in backing up or reversing the vehicle with a hitched trailer hitched to the vehicle at a hitch 14, and may maneuver the vehicle 10 and trailer 16 toward a desired or selected destination location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
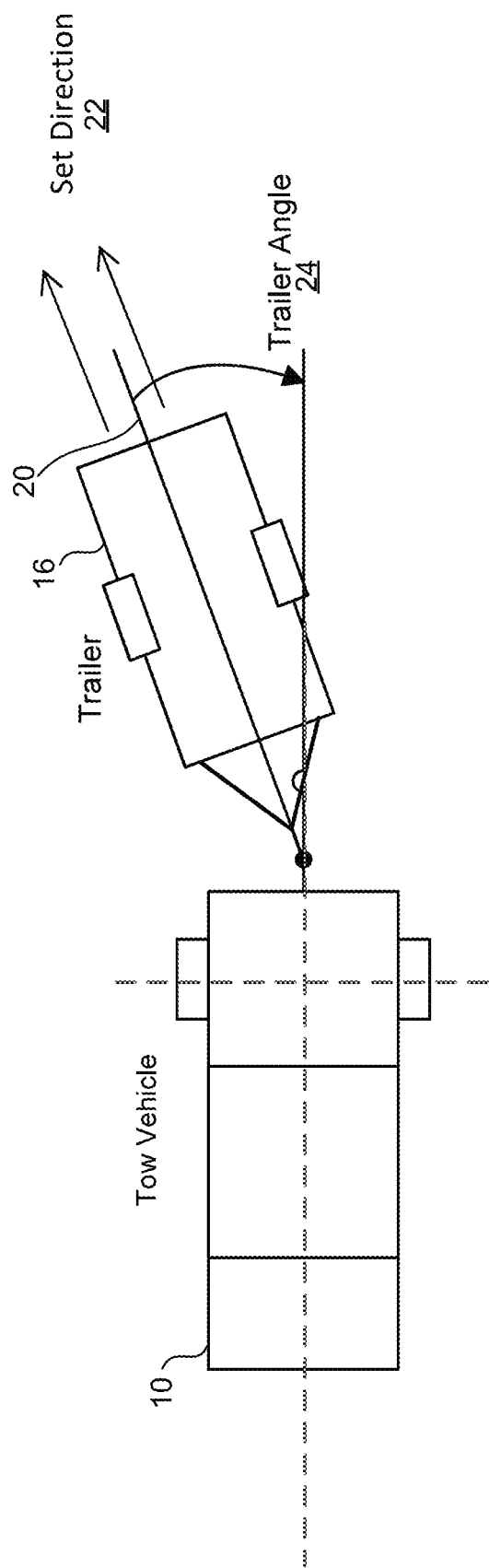
FIG. 2 is a plan view of the vehicle and trailer with a trailer angle and trailer direction.

Referring now to FIG. 2, the trailer assist system or trailer back up assist system 12 controls the vehicle 10 to direct the trailer 16 hitched or attached to the vehicle 10 in the current direction or orientation of the trailer 16 with reference to a center line axis 20 of the trailer 16. The current orientation of the trailer 16 with reference the center line axis 20 of the trailer 16 is referred to as a trailer direction or set direction 22. The system 12 may determine the trailer direction 22 via, for example, trailer angle detection (such as by using aspects of the systems described in U.S. Pat. No. 9,085,261 and/or 6,690,268, and/or U.S. Publication Nos. US-2019-0064831; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, which are hereby incorporated herein by reference in their entireties).

Trailer angle detection determines the trailer angle 24 through the use of rear view camera 18 by measuring or determining or estimating the angle 24 between the towing vehicle 10 and the trailer 16 via processing of image data captured by the rear camera 18 of the towing vehicle 10. After determining the set direction 22, the system 12 controls steering of the towing vehicle (e.g., turns the steering wheel) to direct the trailer when the vehicle 10 is moving or maneuvering in a reverse direction. A driver of the vehicle 10 may be responsible for controlling acceleration/braking (i.e., speed) and gear selection of the towing vehicle 10.

Figure 3:
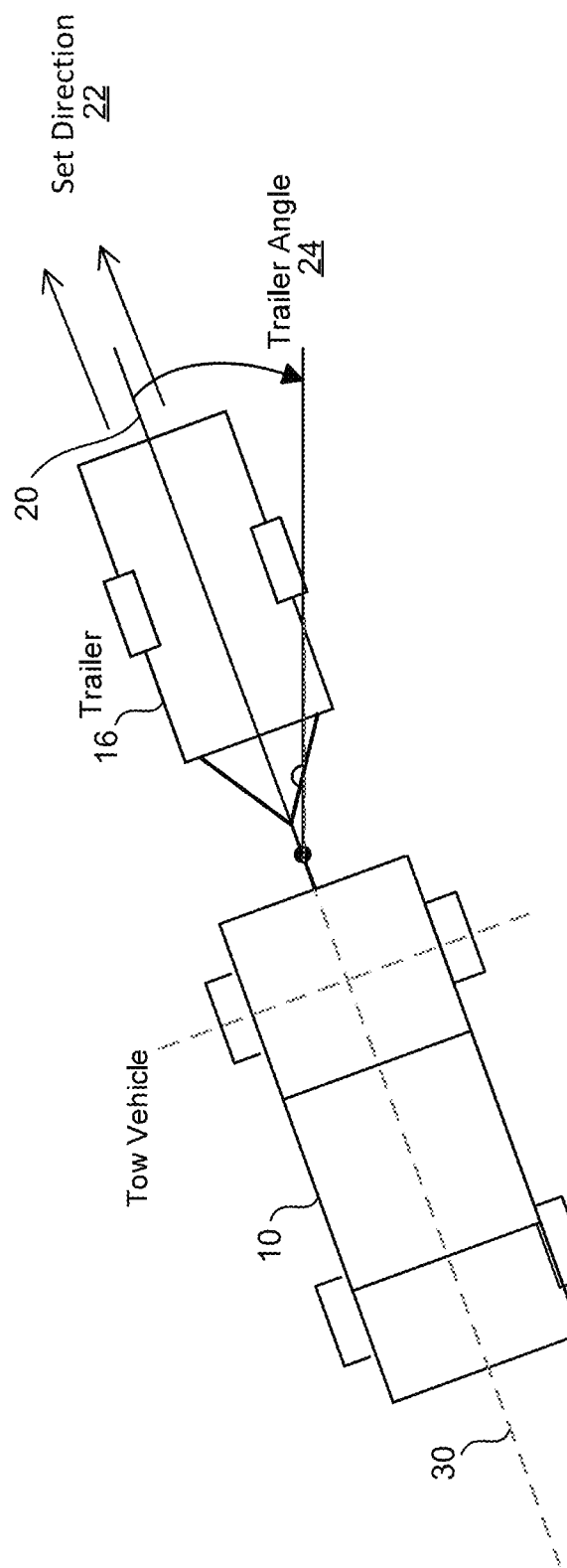
FIG. 3 is another plan view of the vehicle and trailer with a trailer angle and trailer direction.
Figure 4:
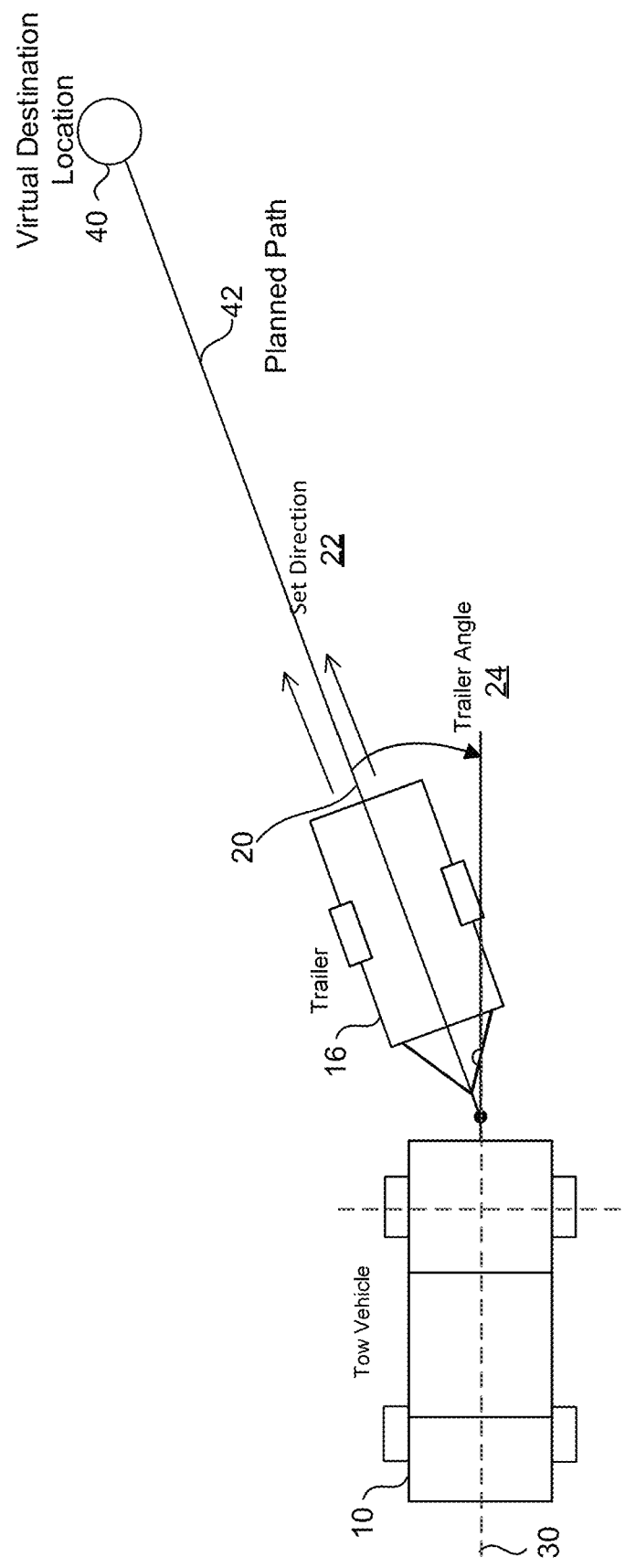
FIG. 4 is a plan view of the vehicle and trailer with a virtual destination location.
Figure 5:
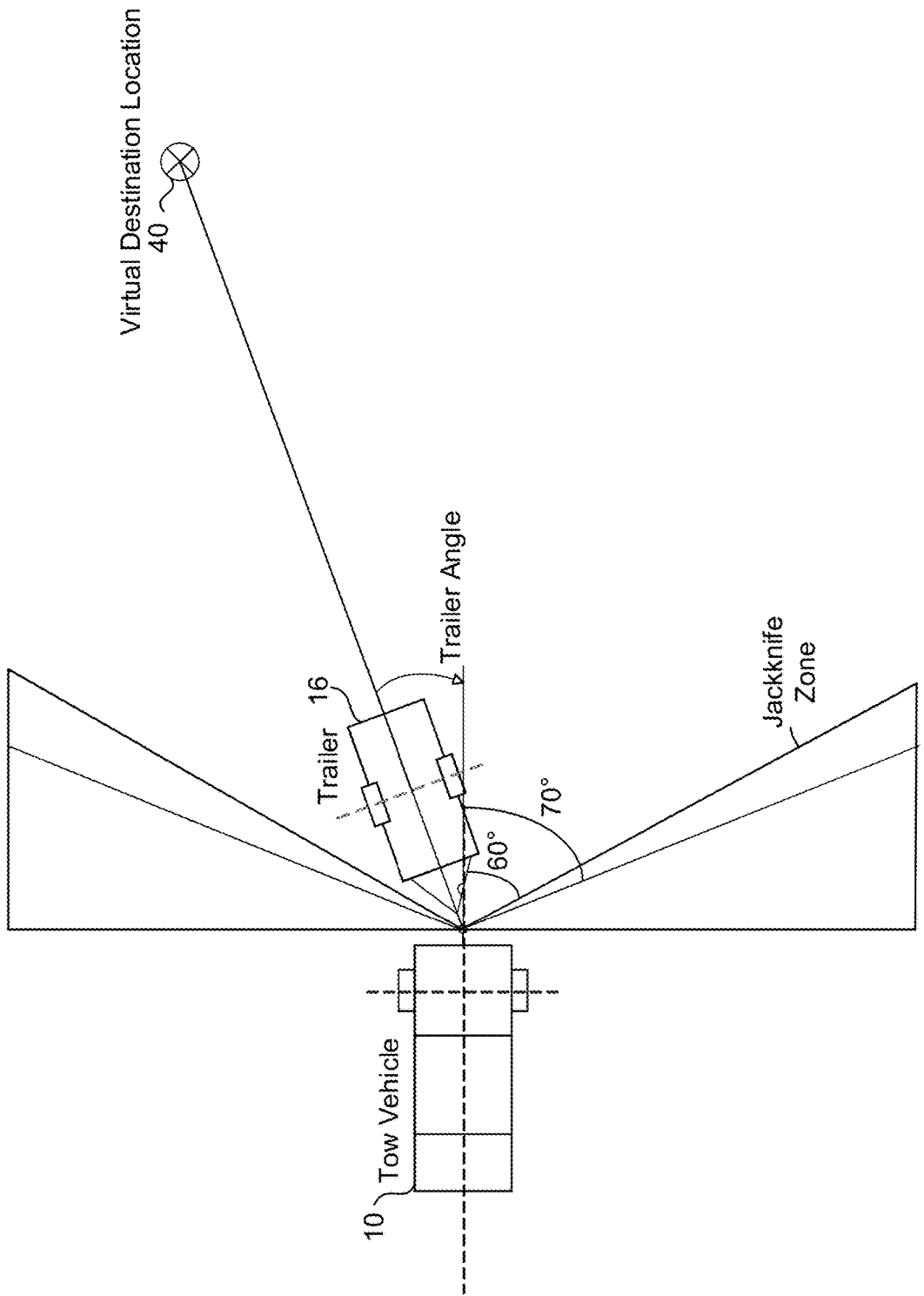
FIG. 5 is a plan view of the vehicle and trailer with a jackknife and collision zone illustrated.

Referring now to FIG. 3, by directing the trailer 16 in the trailer direction 22, the trailer assist system 12 straightens the vehicle 10 and trailer by aligning the center line axis of the trailer 20 with a center line axis of the vehicle 30 in the set direction 22. As shown in FIG. 4, the system 12 determines a virtual destination location (VDL) 40 as a reference point for straightening the vehicle 10. The virtual destination location 40 may, for example, be calculated by the system 12 with reference to the center of a trailer axle of the trailer 16 at the trailer's 16 current location. Upon straightening the vehicle 10 and trailer 16 (so that the longitudinal axis of the trailer is generally aligned with the longitudinal axis of the vehicle), the system 12 controls the vehicle 10 for continuing the maneuver of the trailer 16 towards the virtual destination location 40 until the driver halts the maneuver (e.g., via applying the vehicle's brake or otherwise instructing the system 12 to halt). As shown in FIG. 5, at extreme angles, the trailer may enter into a potential jackknife or collision zone (i.e., collision with the towing vehicle). When the trailer 16, prior to beginning the maneuver, is in a jackknife or collision zone (e.g., the trailer angle is such that the trailer 16 has or is in danger of jackknifing or colliding with the tow vehicle), the system 12 may indicate to the driver that the maneuver is not possible. The indication may be via an audible tone or a display screen or any other appropriate means of communicating with the driver.

The trailer assist system 12 determines the virtual destination location 40 at a distance far enough from the trailer 16 so that offset error is minimized. For example, the offset error for every 100 meters of distance travelled by the trailer may be less than 5 cm. The offset error is defined as a lateral error between the estimated trailer location at each waypoint of a planned path 42 to the virtual destination location 40 and the actual trailer location during maneuver towards the virtual destination location 40. The system 12 may use the vehicle 10 and trailer 16 dimensions to calculate the virtual destination location 40. The system 12 plans the path 42 to the virtual destination point 40 to direct the trailer 16 from the current location to the virtual destination 40. The system 12 estimates the vehicle control parameters required at each waypoint in the planned path 42.

After determining the planned path 42, the system 12 controls the vehicle to direct the trailer 16 towards the virtual destination point 40. The system may move the virtual destination location 40 by the amount of distance travelled by the trailer by incrementing or decrementing the distance from the trailer 16 to the virtual destination location 40. For example, the distance from the trailer to the virtual destination location may be incremented or decremented the amount of distance travelled by the trailer 16 towards or away from the virtual destination location 40, thus keeping the distance between the trailer and the VDL constant. Put another way, if the trailer 16 travelled, for example, ten meters in the same direction of the destination location 40, then ten meters may be added to the distance from the virtual destination location 40. If the trailer 16 travelled ten meters in the opposite direction of the virtual destination location 40, then ten meters is subtracted from the virtual destination location 40. In this way, the distance between the current trailer 16 position and virtual destination location 40 may remain unchanged and constant. Note that ten meters is used just as an example, and the vehicle and trailer may travel any distance.

Figure 6:
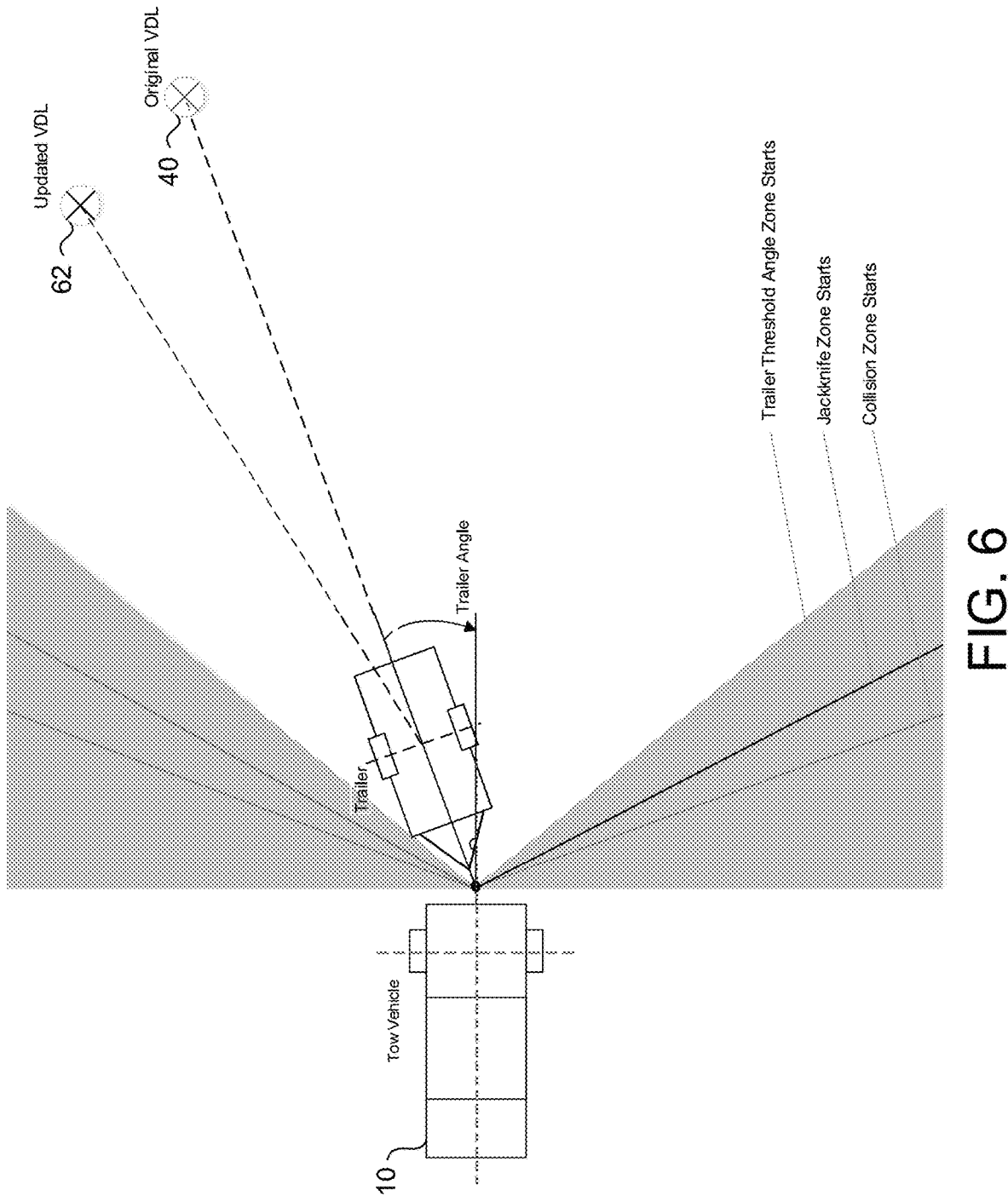
FIG. 6 is a plan view of the vehicle and trailer with an updated virtual destination location.

Referring now to FIG. 6, the driver may, in some embodiments, alter or update the location of the VDL 40 to an updated virtual destination location or VDL 62. The VDL 40 may be changed at any point during or before the maneuver via a VDL changer. For example, the VDL changer may utilize user inputs such as radio dial or knob, the steering wheel (e.g., rotate the steering wheel), or touch screen inputs (virtual dials, horizontal and vertical sliders, etc.) to change the VDL. The trailer assist system 12 may maintain the same distance between the trailer and the original VDL and the trailer and the updated VDL. That is, the updated VDL 62 may alter the angle of the VDL relative to the trailer but not change the distance. The user may be limited to a minimum and maximum change (e.g., the system may limit the updated VDL 62 to keep the towing angle out of the jackknife zone).

Still referring to FIG. 6, a trailer threshold angle defines a trailer angle beyond which jackknifing or a collision may occur. For example, the jackknife angle of a trailer may be around 60 degrees relative to the longitudinal axis of the vehicle, while the collision angle may be around 65 degrees relative to the longitudinal axis of the vehicle. In this scenario, the jackknife angle occurs before the collision angle, and therefore the threshold angle for the trailer is, for example, about 80 percent of the jackknife angle, which is 48 degrees for a jackknife angle of 60 degrees. In another example, the jackknife angle is 60 degrees and the collision angle is 54 degrees. In this scenario, collision occurs before jackknifing, and the threshold angle for the trailer is, for example, 80 percent of the collision angle (i.e., the threshold angle is 43 degrees in this example).

The minimum and maximum angles allowed by the VDL changer may be divided into N discrete steps. The VDL changer may map each step of a trailer angle. For example, the minimum angle for the VDL changer (e.g., 0 degrees) may be greater than a minimum trailer threshold angle (which may be a negative value). The maximum angle for the VDL changer, e.g., (N−1)/2, may be less than a maximum trailer threshold angle (which may be a positive value). A center angle for the VDL (N−1) may define when the trailer angle is at zero and may be set as the default value for the VDL changer.

Figure 7:
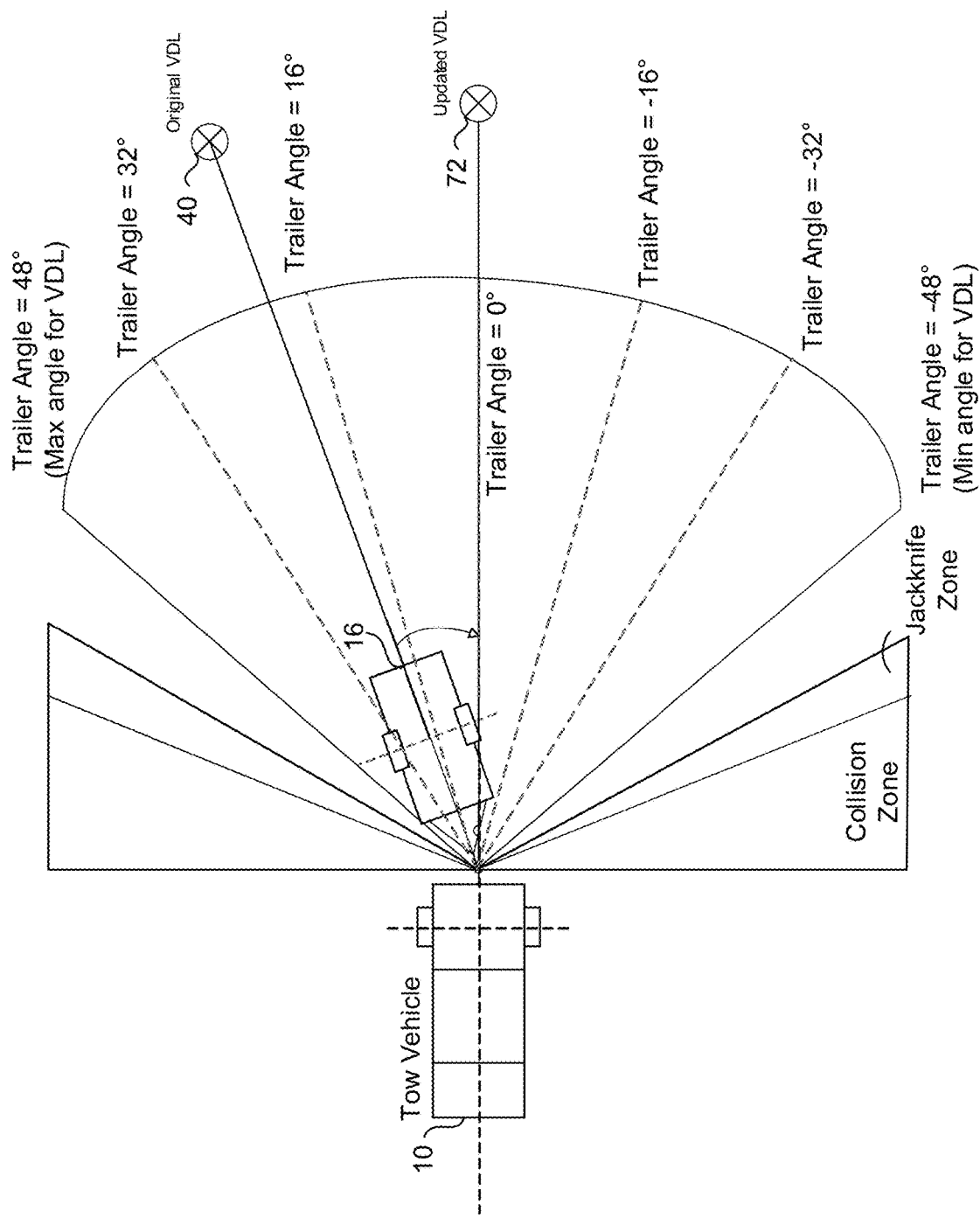
FIG. 7 is a plan view of the vehicle and trailer with a different updated virtual destination location.

Referring now to FIG. 7, the trailer 16 may have, for example, a threshold angle of +/−48 degrees. In this scenario, the minimum angle for VDL is −48 degrees of trailer angle. The maximum angle for VDL is then +48 degrees of trailer angle. The center angle for VDL may then be 0 degrees of trailer angle. As shown in FIG. 7, VDL may offer seven discrete steps (i.e., N=7), which each step size being 16 degrees. However, any number of steps with any corresponding step size may be used. In the illustrated example, if the trailer 16 has a current angle of 20 degrees and the VDL is moved towards the passenger side by a single step, the updated or new VDL is set at a trailer angle of 32 degrees. If the VDL is moved towards the driver side by a single step, the updated VDL is set at a trailer angle of 16 degrees (i.e., 16 degrees is the nearest step to 20 degrees). When the VDL is moved another step towards the driver side (e.g., via the user actuating a user input within the vehicle), the trailer angle would be set to an updated VDL location 72 with a trailer angle moved from 16 degrees to 0 degrees (as illustrated in FIG. 7). That is, in response to actuation of a user input to select one of a plurality of the discrete steps, the VDL changer changes the virtual destination location to a new location that corresponds to the user-selected step. The VDL changer may display on a display within the vehicle each of the available discrete steps (i.e., to the minimum and maximum angles) to allow the user to select the desired trailer angle.

Once the new or updated VDL is set (at an equivalent distance from the trailer as the original VDL), the path to the new VDL is planned. The trailer assist system 12 then defines waypoints along the planned path with necessary steering controls for proper trailer alignment. After planning the path, the system 12 may control steering of the towing vehicle 10 to direct the trailer along the planned path. As the trailer 16 moves, the system 12 may update the VDL changer parameters (e.g., the minimum and maximum values, the jackknife and collision zones, etc.). The user may deactivate the system 12 or otherwise halt the towing vehicle 10 at any point during the maneuver (e.g., by pressing the brake pedal).

Thus, the present invention provides a trailer assist system where the trailer assist is a closed loop system. By calculating the path 42 towards a virtual destination location 40, the trailer assist system 12 obtains prior knowledge of the path 42 in which the trailer 16 will move and the same reference data may be used to identify and correct any deviations/errors in the maneuvers. As previously discussed, the distance between the virtual destination location 40 and the trailer 16 never changes and therefore the system 12 never accumulates errors in trailer angle detection. This helps ensure the trailer 16 never jackknifes. Further, the system 12 ensure the trailer never collides with the towing vehicle 10. The system 12 may compensate for any errors in vehicle/trailer kinematic models and the trailer reaches the desired location accurately.

The trailer assist system may utilize aspects of the trailering or trailer angle detection systems or trailer hitch assist systems described in U.S. Pat. No. 9,085,261 and/or 6,690,268, and/or U.S. Publication Nos. US-2019-0064831; US-2019-0016264; US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, which are hereby incorporated herein by reference in their entireties.

The system may utilize aspects of the trailering assist systems or trailer angle detection systems or trailer hitch assist systems described in U.S. Pat. Nos. 9,446,713; 9,085,261 and/or 6,690,268, and/or U.S. Publication Nos. US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, and/or U.S. patent application Ser. No. 16/441,220, filed on Jun. 14, 2019, and/or Ser. No. 16/408,613, filed on May 10, 2019, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the system may include a display for displaying images captured by one or more of the imaging sensors for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer assist system, the vehicular trailer assist system comprising:
    a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;
    a control comprising an image processor for processing image data captured by the camera, wherein, with the trailer hitched at the hitch of the vehicle, image data captured by the camera is representative of the portion of the trailer hitched at the hitch of the vehicle;
    wherein the control, responsive to processing at the control of image data captured by the camera, during a reversing maneuver of the vehicle and trailer while the vehicle is in motion and is towing the trailer, determines a trailer angle of the trailer relative to the vehicle;
    wherein, responsive to determination by the control of the trailer angle, the control determines a trailer direction representative of the direction of movement of the trailer while the vehicle is towing the trailer, and wherein the determined trailer direction is based at least in part on the determined trailer angle;
    wherein the control determines a virtual destination location, and wherein the virtual destination location is a location that is a predetermined distance from the trailer and in the determined trailer direction;
    wherein, responsive to determination by the control of the trailer direction and the virtual destination location, and during the reversing maneuver of the vehicle and trailer, the control controls steering of the vehicle to direct the trailer in the determined trailer direction towards the virtual destination location;
    wherein the control, responsive to a user input, updates the virtual destination location to a second virtual destination location, wherein the second virtual destination location is a location that is another predetermined distance from the trailer; and
    wherein the user input comprises a selection and actuation of a particular zone of a plurality of zones displayed at a display screen for viewing by the driver of the vehicle, and wherein the displayed plurality of zones are representative of respective ranges of trailer angles of the trailer relative to the vehicle.

2. A vehicular trailer assist system, the vehicular trailer assist system comprising:
    a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;
    a control comprising an image processor for processing image data captured by the camera, wherein, with the trailer hitched at the hitch of the vehicle, image data captured by the camera is representative of the portion of the trailer hitched at the hitch of the vehicle;
    wherein the control, responsive to processing at the control of image data captured by the camera, during a reversing maneuver of the vehicle and trailer while the vehicle is in motion and is towing the trailer, determines a trailer angle of the trailer relative to the vehicle;
    wherein, responsive to determination by the control of the trailer angle, the control determines a trailer direction representative of the direction of movement of the trailer while the vehicle is towing the trailer, and wherein the determined trailer direction is based at least in part on the determined trailer angle;
    wherein the control determines a virtual destination location, and wherein the virtual destination location is a location that is a predetermined distance from the trailer and in the determined trailer direction;
    wherein, responsive to determination by the control of the trailer direction and the virtual destination location, and during the reversing maneuver of the vehicle and trailer, the control controls steering of the vehicle to direct the trailer in the determined trailer direction towards the virtual destination location; and
    wherein the control, as the trailer is moved toward or away from the virtual destination location, updates the virtual destination location such that the distance between the virtual destination location and the trailer remains constant.

3. The vehicular trailer assist system of claim 2, wherein the control is operable to determine if the trailer is located in a jackknife zone, and wherein, responsive to determining the trailer is located in the jackknife zone, the control generates an alert.

4. The vehicular trailer assist system of claim 3, wherein the alert comprises a warning that the trailer cannot be steered by the vehicular trailer assist system.

5. A vehicular trailer assist system, the vehicular trailer assist system comprising:
- a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;
- a control comprising an image processor for processing image data captured by the camera, wherein, with the trailer hitched at the hitch of the vehicle, image data captured by the camera is representative of the portion of the trailer hitched at the hitch of the vehicle;
- wherein the control, responsive to processing at the control of image data captured by the camera, during a reversing maneuver of the vehicle and trailer while the vehicle is in motion and is towing the trailer, determines a trailer angle of the trailer relative to the vehicle;
- wherein, responsive to determination by the control of the trailer angle, the control determines a trailer direction representative of the direction of movement of the trailer while the vehicle is towing the trailer, and wherein the determined trailer direction is based at least in part on the determined trailer angle;
- wherein the control determines a virtual destination location, and wherein the virtual destination location is a location that is a predetermined distance from the trailer and in the determined trailer direction;
- wherein, responsive to determination by the control of the trailer direction and the virtual destination location, and during the reversing maneuver of the vehicle and trailer, the control controls steering of the vehicle to direct the trailer in the determined trailer direction towards the virtual destination location; and
- wherein the control is operable to determine if the trailer is located within a threshold distance of a jackknife zone, and wherein, responsive to determining the trailer is located within the threshold distance of the jackknife zone, the control generates an alert.

6. The vehicular trailer assist system of claim 5, wherein the threshold distance is greater than 80 percent of a jackknife angle for the trailer.

7. The vehicular trailer assist system of claim 5, wherein the determined trailer direction aligns with a center line axis of the trailer.

8. The vehicular trailer assist system of claim 5, wherein, prior to the reversing maneuver of the vehicle and trailer, the control instructs a driver of the vehicle to straighten the trailer relative to the vehicle by driving the vehicle forward.

9. The vehicular trailer assist system of claim 5, wherein the control determines the virtual destination location based at least in part on dimensions of the vehicle and the trailer.

10. The vehicular trailer assist system of claim 5, wherein the control, responsive to a user input, updates the virtual destination location to a second virtual destination location, wherein the second virtual destination location is a location that is another predetermined distance from the trailer.

11. The vehicular trailer assist system of claim 10, wherein the distance between the second virtual destination location and the trailer is the same as the distance between the virtual destination location and the trailer.

12. The vehicular trailer assist system of claim 10, wherein the control, responsive to updating the virtual destination location, controls steering of the vehicle to direct the trailer in another trailer direction towards the second virtual destination location.

13. A vehicular trailer assist system, the vehicular trailer assist system comprising:
- a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;
- a control comprising an image processor for processing image data captured by the camera, wherein, with the trailer hitched at the hitch of the vehicle, image data captured by the camera is representative of the portion of the trailer hitched at the hitch of the vehicle;
- wherein the control, responsive to processing at the control of image data captured by the camera, during a reversing maneuver of the vehicle and trailer while the vehicle is in motion and is towing the trailer, determines a trailer angle of the trailer relative to the vehicle;
- wherein, responsive to determination by the control of the trailer angle, the control determines a trailer direction representative of the direction of movement of the trailer while the vehicle is towing the trailer, and wherein the determined trailer direction is based at least in part on the determined trailer angle;
- wherein the control determines a virtual destination location, and wherein the virtual destination location is a location that is a predetermined distance from the trailer and in the determined trailer direction;
- wherein, responsive to determination by the control of the trailer direction and the virtual destination location, and during the reversing maneuver of the vehicle and trailer, the control controls steering of the vehicle to direct the trailer in the determined trailer direction towards the virtual destination location; and
- wherein the predetermined distance of the virtual destination location is far enough from the trailer to reduce an offset error to less than five centimeters, wherein the offset error is a lateral error between an estimated trailer location at one or more waypoints of a planned path to the virtual destination location and the actual trailer location during the reversing maneuver towards the virtual destination location.

14. A vehicular trailer assist system, the vehicular trailer assist system comprising:
- a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;
- a control comprising an image processor for processing image data captured by the camera, wherein, with the trailer hitched at the hitch of the vehicle, image data captured by the camera is representative of the portion of the trailer hitched at the hitch of the vehicle;
- wherein the control, responsive to processing at the control of image data captured by the camera, during a reversing maneuver of the vehicle and trailer while the vehicle is in motion and is towing the trailer, determines a trailer angle of the trailer relative to the vehicle;
- wherein, responsive to determination by the control of the trailer angle, the control determines a trailer direction representative of the direction of movement of the trailer while the vehicle is towing the trailer, and wherein the determined trailer direction is based at least in part on the determined trailer angle;

wherein the control determines a virtual destination location, and wherein the virtual destination location is a location that is a predetermined distance from the trailer and in the determined trailer direction;

wherein, responsive to determination by the control of the trailer direction and the virtual destination location, and during the reversing maneuver of the vehicle and trailer, the control controls steering of the vehicle to direct the trailer in the determined trailer direction towards the virtual destination location; and a display, wherein the vehicular trailer assist system is operable to determine a minimum angle for the trailer angle and a maximum angle for the trailer angle, and wherein trailer angles greater than the minimum angle and less than the maximum angle will ensure the trailer will not jackknife during the reversing maneuver, and wherein the vehicular trailer assist system is operable to divide the angles between the minimum angle and the maximum angle into a plurality of discrete steps, and wherein the vehicular trailer assist system is operable to display on a display screen of the display the plurality of discrete steps, and wherein the vehicular trailer assist system, in response to a user actuating an input to select one of the plurality of discrete steps, changes the virtual destination location to a new location that corresponds to the selected step.

15. A vehicular trailer assist system, the vehicular trailer assist system comprising:

a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;

a control comprising an image processor for processing image data captured by the camera, wherein, with the trailer hitched at the hitch of the vehicle, image data captured by the camera is representative of the portion of the trailer hitched at the hitch of the vehicle;

wherein the control, responsive to processing at the control of image data captured by the camera, during a reversing maneuver of the vehicle and trailer while the vehicle is in motion and is towing the trailer, determines a trailer angle of the trailer relative to the vehicle;

wherein, responsive to determination by the control of the trailer angle, the control determines a trailer direction representative of the direction of movement of the trailer while the vehicle is towing the trailer, and wherein the determined trailer direction is based at least in part on the determined trailer angle;

wherein the control determines a virtual destination location, and wherein the virtual destination location is a location that is a predetermined distance from the trailer and in the determined trailer direction;

wherein, responsive to determination by the control of the trailer direction and the virtual destination location, and during the reversing maneuver of the vehicle and trailer, the control controls steering of the vehicle to direct the trailer in the determined trailer direction towards the virtual destination location;

wherein the control, responsive to a user input, adjusts the virtual destination location to a second virtual destination location, wherein the second virtual destination location is a location that is the same distance from the trailer as the virtual destination location;

wherein the user input comprises a selection and actuation of a particular zone of a plurality of zones displayed at a display screen for viewing by the driver of the vehicle, and wherein the displayed plurality of zones are representative of respective ranges of trailer angles of the trailer relative to the vehicle; and wherein, responsive to determination by the control of the second virtual destination location, and during the reversing maneuver of the vehicle and trailer, the control controls steering of the vehicle to direct the trailer towards the second virtual destination location.

16. The vehicular trailer assist system of claim 15, wherein the control, as the trailer is moved toward or away from the virtual destination location or the second virtual destination location, updates the virtual destination location or the second virtual destination location such that the distance between the virtual destination location or the second virtual destination location and the trailer remains constant.

17. The vehicular trailer assist system of claim 15, wherein the control determines the virtual destination location based at least in part on dimensions of the vehicle and the trailer.

18. A vehicular trailer assist system, the vehicular trailer assist system comprising:

a camera disposed at a rear portion of a vehicle and having a field of view exterior and at least rearward of the vehicle, wherein, with a trailer hitched at a hitch of the vehicle, the field of view of the camera encompasses a portion of the trailer hitched at the hitch of the vehicle;

a control comprising an image processor for processing image data captured by the camera, wherein, with the trailer hitched at the hitch of the vehicle, image data captured by the camera is representative of the portion of the trailer hitched at the hitch of the vehicle;

wherein the control, responsive to processing at the control of image data captured by the camera, during a reversing maneuver of the vehicle and trailer while the vehicle is in motion and is towing the trailer, determines a trailer angle of the trailer relative to the vehicle;

wherein, responsive to determination by the control of the trailer angle, the control determines a trailer direction representative of the direction of movement of the trailer while the vehicle is towing the trailer, and wherein the determined trailer direction is based at least in part on the determined trailer angle;

wherein the control determines a virtual destination location, and wherein the virtual destination location is a location that is a predetermined distance from the trailer and in the determined trailer direction;

wherein, responsive to determination by the control of the trailer direction and the virtual destination location, and during the reversing maneuver of the vehicle and trailer, the control controls steering of the vehicle to direct the trailer in the determined trailer direction towards the virtual destination location;

wherein the control, as the trailer is moved toward or away from the virtual destination location, updates the virtual destination location such that the distance between the virtual destination location and the trailer remains constant;

wherein the control, responsive to a user input, adjusts the virtual destination location to a second virtual destination location, and wherein the second virtual destination location is a location that is another predetermined distance from the trailer;

wherein the user input comprises a selection and actuation of a particular zone of a plurality of zones displayed at a display screen for viewing by the driver of the vehicle, and wherein the displayed plurality of zones are representative of respective ranges of trailer angles of the trailer relative to the vehicle; and wherein, responsive to determination by the control of the second virtual destination location, and during the reversing maneuver of the vehicle and trailer, the control controls steering of the vehicle to direct the trailer towards the second virtual destination location.

19. The vehicular trailer assist system of claim 18, wherein the predetermined distance of the virtual destination location is far enough from the trailer to reduce an offset error to less than five centimeters, and wherein the offset error is a lateral error between an estimated trailer location at one or more waypoints of a planned path to the virtual destination location and the actual trailer location during the reversing maneuver towards the virtual destination location.

\* \* \* \* \*